United States Patent
Carver et al.

(10) Patent No.: US 7,194,372 B2
(45) Date of Patent: Mar. 20, 2007

(54) METHOD AND SYSTEM FOR VERIFYING AN EMBEDDED MODULE OF A MOBILE VEHICLE

(75) Inventors: Howard J. Carver, Troy, MI (US); Steven D. Scott, Pleasant Ridge, MI (US); John L. Dale, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 80 days.

(21) Appl. No.: 10/996,635

(22) Filed: Nov. 23, 2004

(65) Prior Publication Data

US 2006/0132297 A1    Jun. 22, 2006

(51) Int. Cl.
*G01R 21/28* (2006.01)
(52) U.S. Cl. .................................................. 702/119
(58) Field of Classification Search ................ 702/119
See application file for complete search history.

(56) References Cited

U.S. PATENT DOCUMENTS

| | | | |
|---|---|---|---|
| 6,728,612 B1* | 4/2004 | Carver et al. | 701/33 |
| 2003/0046329 A1* | 3/2003 | Sasabe et al. | 709/201 |
| 2006/0079219 A1* | 4/2006 | Nicolini | 455/423 |

* cited by examiner

*Primary Examiner*—Michael Nghiem
*Assistant Examiner*—Demetrius Pretlow
(74) *Attorney, Agent, or Firm*—Anthony Luke Simon (57) ABSTRACT

A method and system for verifying an embedded module of a mobile vehicle. The method includes the steps of providing a validation test plan including a plurality of test keywords indexed to a requirement in a spread sheet format, receiving a validation test plan request including at least one requirement, determining the test keywords of the validation test plan based on the requirement according to a test keyword definition, and sending the test keywords from a call center to the embedded module based on correspondence between the requirement and test keywords. A computer usable medium with suitable computer program code is employed for verifying an embedded module of a mobile vehicle.

18 Claims, 5 Drawing Sheets

METHOD AND SYSTEM FOR VERIFYING AN EMBEDDED MODULE OF A MOBILE VEHICLE

FIELD OF THE INVENTION

This invention relates generally to testing of mobile vehicles. In particular the invention relates to verifying an embedded module of a mobile vehicle.

BACKGROUND OF THE INVENTION

Automated testing methodologies are becoming increasingly important as the complexity of embedded systems in mobile vehicles grows. In addition, the need for validation of these systems against various functional and design requirements is critical to the proper operation of these systems. Consequently, the time and resources required to validate these embedded systems has increased.

To reduce the time and resources required for validation, certain obstacles need to be overcome. Manual testing procedures utilize human interfaces to the mobile vehicle and embedded module. Significant manpower is required to execute these tests and document the results obtained. Efforts to automate various aspects of the testing process have reduced the manpower and time required for testing but further action is needed to increase efficiency and further reduce the resources consumed. To further automate testing, a set of software interfaces must be designed to simulate the human interfaces they replace.

Manually created test plans are comprised of a list of instructions that a person conducting the test must follow. The challenge is to design a machine readable test plan format while still maintaining a test plan that is human readable. To fully automate the test plan execution, a common format must be defined that is capable of being parsed by a software-based execution engine. Human readable text is generally not conducive as input to an automated process. Syntax and context must be controlled to allow the execution engine to properly read the test plan input and then direct that input to the proper interface.

Testing of embedded modules is driven directly from requirements specified by original equipment manufacturers and embedded module developers. Requirements documents are reviewed and test plans are developed to test against those requirements. Each plan tends to be unique and a limited use of standard testing modules is employed. Without a common user interface linked to a requirements database, linking the test plan directly to the requirements and utilizing reusable testing modules is difficult to implement.

Version control is another function that is difficult to accomplish without the availability of automated systems to track the various versions of requirements documents, test plans and test results. The use of version control assures that the applicable test results are tied to the version of the requirements used to develop the test plan.

It is therefore desirable to provide a method and system for verifying an embedded module of a mobile vehicle that overcomes the limitations, challenges, and obstacles described above.

SUMMARY OF THE INVENTION

One aspect of the present invention provides a method for verifying an embedded module of a mobile vehicle comprising providing a validation test plan including a plurality of test keywords indexed to a requirement in a spread sheet format, receiving a validation test plan request including at least one requirement, determining the test keywords of the validation test plan based on the requirement according to a test keyword definition, and sending the test keywords from a call center to the embedded module based on correspondence between the requirement and test keywords.

Another aspect of the present invention provides a system for verifying an embedded module of a mobile vehicle comprising means for providing a validation test plan including a plurality of test keywords indexed to a requirement in a spread sheet format, means for receiving a validation test plan request including at least one requirement, means for determining the test keywords of the validation test plan based on the requirement according to a test keyword definition, and means for sending the test keywords from a call center to the embedded module based on correspondence between the requirement and test keywords.

A third aspect of the present invention provides a computer readable medium storing a computer program including computer readable code for verifying an embedded module of a mobile vehicle comprising computer program code for providing a validation test plan including a plurality of test keywords indexed to a requirement in a spread sheet format, computer program code for receiving a validation test plan request including at least one requirement, computer program code for determining the test keywords of the validation test plan based on the requirement according to a test keyword definition, and computer program code for sending the test keywords from a call center to the embedded module based on correspondence between the requirement and test keywords.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
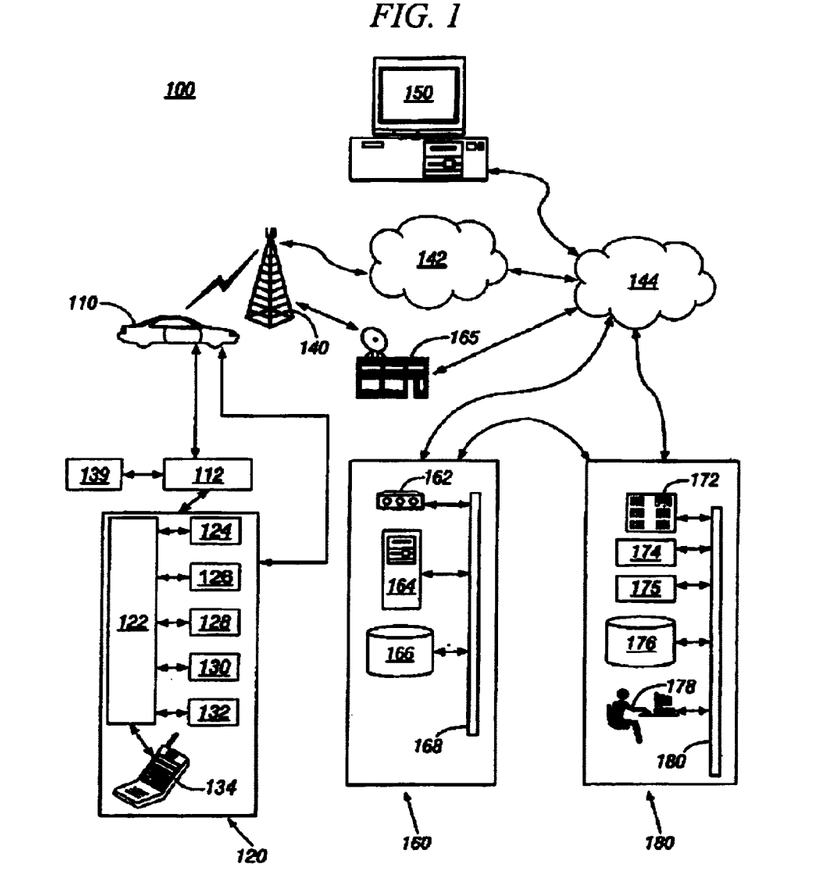
FIG. 1 illustrates one embodiment of a system validating an embedded module of a mobile vehicle, in accordance with the present invention.

FIG. 1 illustrates one embodiment of a system validating an embedded module of a mobile vehicle, in accordance with the present invention at 100. The diagnostic system includes a mobile vehicle communication unit (MVCU) 110, a vehicle communication network 112, one or more embedded modules 139 including a telematics unit 120, one or more wireless carrier systems 140, one or more communication networks 142, one or more land networks 144, one or more client, personal, or user computers 150, one or more web-hosting portals 160, and one or more call centers 170. In one embodiment, MVCU 110 is implemented as a mobile vehicle equipped with suitable hardware and software for transmitting and receiving voice and data communications. A display may be embedded in MVCU 110. The display may be a dialed digital display such as a radio unit or an instrument panel. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components such as, for example, GPS unit 126 or speakers 132. Telematics unit 120 may include additional components not relevant to the present discussion.

In one embodiment, processor 122 is implemented as a microcontroller, microprocessor, controller, host processor, or vehicle communications processor. In an example, processor 122 is implemented as an application-specific integrated circuit (ASIC). In another embodiment, processor 122 is implemented as a processor working in conjunction with a central processing unit (CPU) performing the function of a general purpose processor. In another embodiment, processor 122 is implemented as a digital signal processor (DSP). GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various embedded modules 139 in the vehicle. In one embodiment, these digital signals activate the programming mode and operation modes, as well as provide for data transfers. In another embodiment, signals from processor 122 are translated into voice messages and sent out through speaker 132.

An embedded module 139 is any of a number of electronic modules designed to carry out a specific function in the mobile vehicle. Telematics unit 120 is one type of embedded module. Another embedded module is, for example, a powertrain controller which regulates and controls vehicle locomotive functions. Yet another example of an embedded module is a body controller which controls various vehicle functions, such as power door locks. An automated test system 175 interfaces with these embedded modules 139 to test the operation of the embedded module against specified requirements stored in a requirements database of the automated test system 175.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, satellite uplink facility 165, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160, satellite uplink facility 165, and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a test center facilitating communications to mobile vehicle 110 for testing of embedded modules 139. In another embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more automated test systems 175, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in MVCU 110 through wireless carrier system 140, communication network 142, land network 144 and web hosting portals 160 using voice or data transmissions. In an alternative embodiment, communication services manager 174 communicates with telematics unit 120 in MVCU 110 through wireless carrier system 140, communication network 142, land network 144, and web hosting portals 160 using voice or data transmissions. Switch 172 selects between voice transmissions and data transmissions.

Automated test system 175 manages data, including requirements documents, validation test plans, and test result reports used to verify embedded modules 139. Additionally, automated test system 175 controls input to and output from the embedded module 139 being verified.

Figure 2:
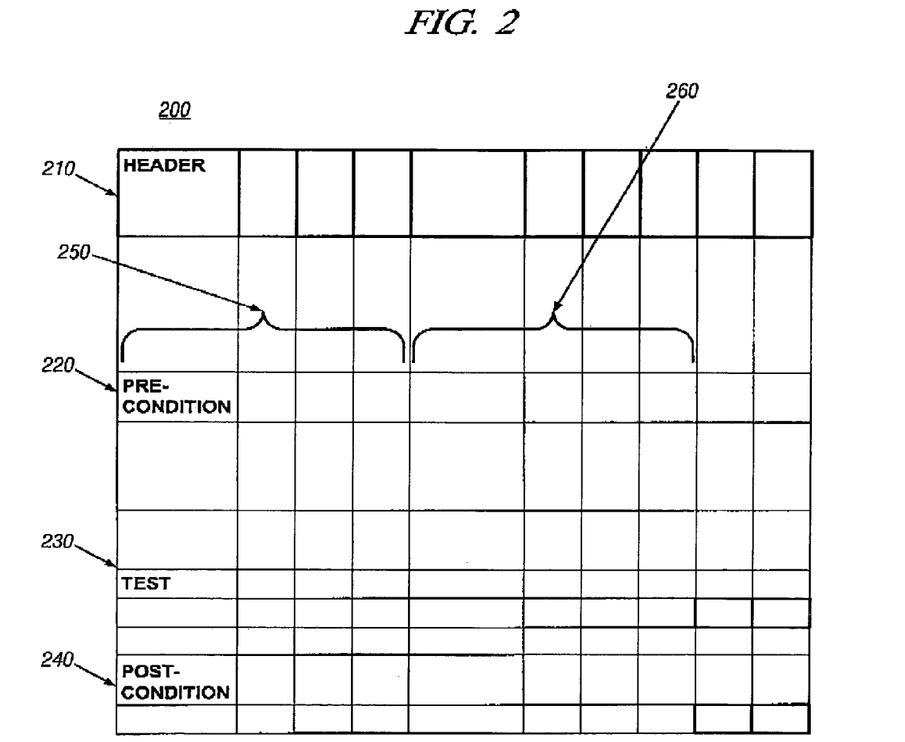
FIG. 2 illustrates one embodiment of a commonly formatted validation test plan spreadsheet, in accordance with the present invention.

FIG. 2 illustrates one embodiment of a commonly formatted validation test plan spreadsheet, in accordance with the present invention at 200. The validation test plan spreadsheet includes at least one test case tied to the requirement to be tested. Each test case is comprised of a test case header 210 that identifies the start of a test case and communicates information for the test case such as the test case name and whether the test case is to be conducted manually or automatically, a pre-condition command sequence 220 that contains the test case keywords required to take the telematics unit from a validation test plan default configuration to a test case specific configuration, a test case command sequence 230 that contains the test case keywords required to validate the requirement under test, and a post-condition command sequence 240 that contains the test case keywords required to take the telematics unit from the test case specific configuration back to the validation test plan default configuration.

Each of these sections of the validation test plan spreadsheet comprises a predetermined number of rows within the spreadsheet. The format is consistent among all validation test plans to facilitate automation of the validation test plan execution. An action command keywords subsection 250 contains the test keywords and associated parameter keywords that comprise the action sent to the embedded module 139. A response keywords subsection 260 contains the response keywords and the associated response parameter keywords expected from the embedded module 139. A single test case command takes up a single row and includes an action command keywords subsection 250 and a response keywords subsection 260. The length of the test case command section varies depending on the number of distinct test steps required for the test case.

The keywords are organized in the validation test plan in columns. In one embodiment, the columns are assigned the following definitions: action timing, action command type, action command, action parameters, response timing, response command type, response command, response parameters, ots requirement and result.

Figure 3:
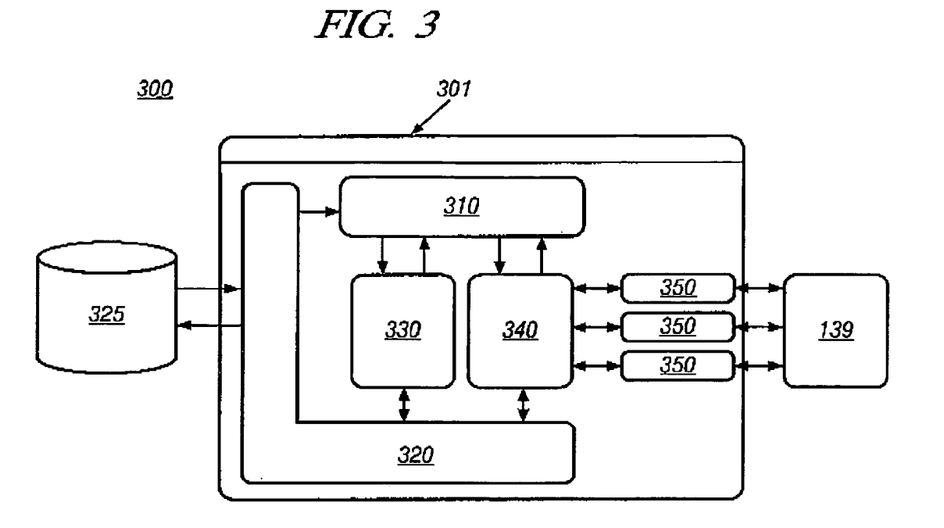
FIG. 3 illustrates detail of one embodiment the automated testing system at 175 of FIG. 1.

FIG. 3 illustrates detail of one embodiment the automated testing system at 175 of FIG. 1, in accordance with the present invention at 300. The relationships of various software structures used in the invention are shown. Automated testing system 301 includes a graphical user interface 310, a validation test plan data interface 320, various databases 325, a validation test plan development engine 330, a validation test plan execution engine 340, and various interfaces 350 to embedded module 139.

The graphical user interface (GUI) 310 enables the user to configure the automated testing system vehicle interface to the target mobile vehicle architecture of the embedded module under test. For example, for telematics unit 120 the GUI 310 enables power moding, and audio arbitration of the telematics unit 120 under test. The GUI 310 also allows the user to manually control the telematics unit 120 power mode and button interface, manually filter and transmit vehicle communication bus messages, and control compilation and execution of commonly formatted validation test plans.

The validation test plan data interface 320 enables various automated test system components to access the databases 325, including a requirements database, commonly formatted validation test plans and global initial configuration documents necessary for validation test plan execution. The requirements database specifies the requirements to which a particular embedded module 139 must conform. The global initial configuration documents identify the initial settings for configurable parameters of the embedded module 139 required for validation test plan execution.

The validation plan development engine 330 provides the interface that allows control of the selection of validation test plans based on requirements in the requirements database and initiation of the execution of the validation test plan. The interface is provided as a sub-panel in the GUI 310.

The validation test plan execution engine 340 contains the logic and creates the interfaces 350 necessary to execute the validation test plans. Examples of the interfaces 350 created for a telematics unit 120 include a validation plan execution console, a wireless interface, vehicle interface and speech recognition interface. The validation plan execution console is a graphical user interface component. Execution control and feedback for the testing of the selected requirements is available through this control panel. The wireless, vehicle and speech recognition interfaces are utilized to control and monitor the wireless, user, and mobile vehicle interfaces required for telematics unit validation.

The test control interfaces allow the execution of the validation test plan to emulate direct user interaction with the embedded module 139. Test control interfaces 350 tie into the input/output of the embedded module 139, such as telematics unit 120 allowing control and testing of subsystems such as GPS, voice, button interface and other human and electrical interfaces. For example, the speech recognition interface is an interface 350 that enables the validation plan execution engine 340 to control and monitor the speech recognition user interface of the telematics unit 120. Speech recognition interface commands are issued to the telematics unit 120 under test and the response prompts of the telematics unit 120 are recorded. This interface 350 is used to validate that the recorded telematics unit 120 response prompts match the expected prompts called out in the validation test plan. In another embodiment, additional or different interfaces 350 are created.

Figure 4:
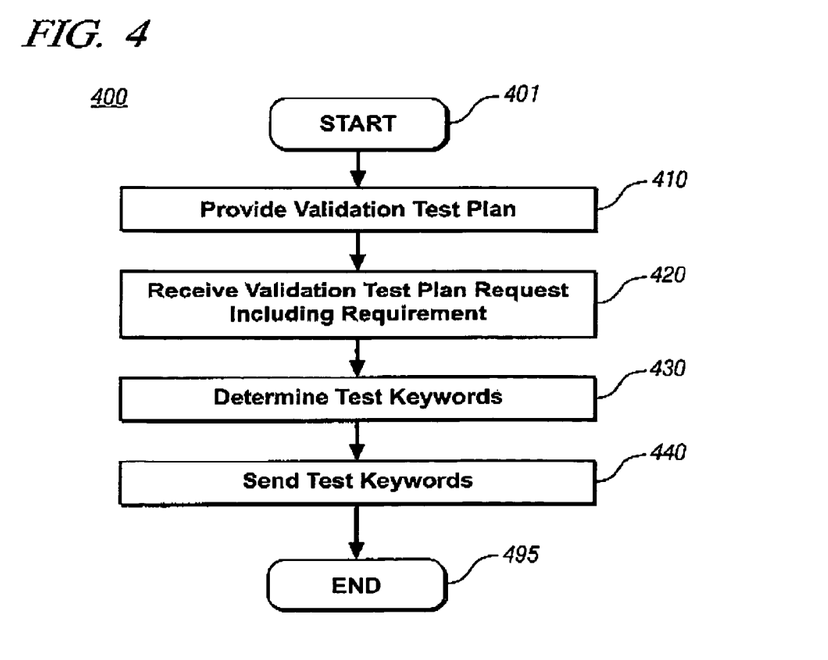
FIG. 4 illustrates a flowchart representative of one embodiment of a method for verifying an embedded module of a mobile vehicle, in accordance with the present invention.

FIG. 4 illustrates a flowchart representative of one embodiment of a method 400 for verifying an embedded module of a mobile vehicle, in accordance with the present invention. The method begins at 401.

During step 410, a validation test plan is provided. The validation test plan includes a plurality of test keywords indexed to a requirement in a spread sheet format. The validation test plan, such as the one illustrated in FIG. 2, is created based on a requirements database. A requirement is an operational structure that an embedded module must conform to as defined in the embedded module's functional specification. The requirements database comprises all of the specifications for how the embedded module should perform under various conditions. One example of a specification in the requirements database is a technical specification for a telematics unit containing a list of "shall" statements. One such statement is the headlight "shall be set to flash when the mobile vehicle is disabled." The requirements are derived from multiple sources including those specified by original equipment manufacturers and those specified by embedded module developers. Validation test plans are stored in a commonly formatted test plan database of automated test system 175.

Test keywords are strictly defined terms that define all action and response components in the validation test plan spreadsheet. Test keywords are classified as action keywords and response keywords. One example is an action keyword "lights_check" defined as a command to verify the state of the headlights of a mobile vehicle. An associated response keyword is "headlights_state" defined as a parameter whose value indicates the state of the mobile vehicle's headlights. The test keywords defined as parameter values associated to the "headlights_state" keyword are "on," "off," and "flashing."

Test keywords are classified and defined according to one of the following test keyword definitions: action component, response component, timing control, action type, command type parameter, command type parameter value, requirement ID, and results.

During step 420, a validation test plan request is received that includes at least one requirement. The validation test plan request is a selection of a single requirement or a group of requirements to validate. The validation test plan request is submitted through a graphical user interface. The validation test plan, which is linked directly to the requirements to be tested, is generated by the system and output to an execution engine. The validation test plan execution engine contains the logic, interfacing and threading necessary to execute the validation test plans based on the selected requirements.

During step 430, the test keywords of the validation test plan are determined based on the requirement. The validation test case spreadsheet is scanned for the test keywords that correspond to the requirement received with the validation test plan request. The keywords determined from the validation test plan are then mapped directly to the operation controlling the interface to the module under test.

During step 440, the test keywords are sent from the call center to the embedded module 139 based on correspondence between the requirement and the test keywords. The execution engine 340 through control interfaces 350 manages the testing of the selected requirements. The execution engine 340 manages the action keywords sent and the response keywords received from the embedded module being tested.

During step 495, method 400 is terminated.

Figure 5:
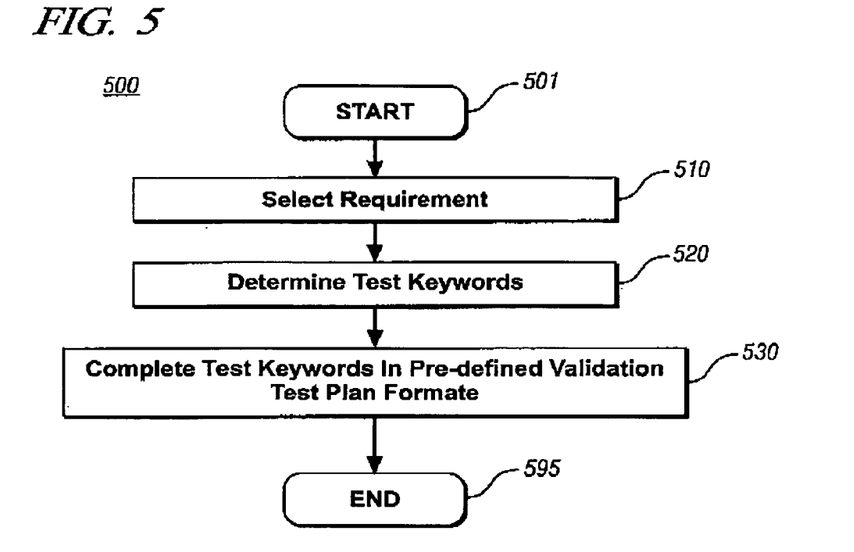
FIG. 5 illustrates a flowchart detailing the step of providing a validation test plan including a plurality of test keywords indexed to a requirement in a spreadsheet format at 410 of FIG. 4, in accordance with the present invention.

FIG. 5 illustrates a method 500 detailing the step of providing a validation test plan including a plurality of test keywords indexed to a requirement in a spreadsheet format at 410 of FIG. 4, in accordance with the present invention. The step detail begins at 501.

During step 510, the requirement is selected from a requirements database. An operator selects the particular requirements to be tested from the collection of all requirements stored in the requirements database. In one embodiment, the requirement selected is based on the identification of an original equipment manufacturer, a mobile vehicle model year, a validation test plan section name, and a version number. The operator selects requirements using the graphical user interface 310.

During step 520, the test keywords required for testing against the requirement are determined. The test keywords are defined in an automated test system specification stored in the validation test plan database. In one embodiment test keywords are combined in validation test plan sections that contain pre-formatted test segments that are linked to create the validation test plan.

During step 530, the test keywords are compiled in a predefined validation test plan format. In one embodiment, the pre-formatted test segments are compiled based on the validation test plan format illustrated in FIG. 2.

During step 595, method 500 is terminated.

Figure 6:
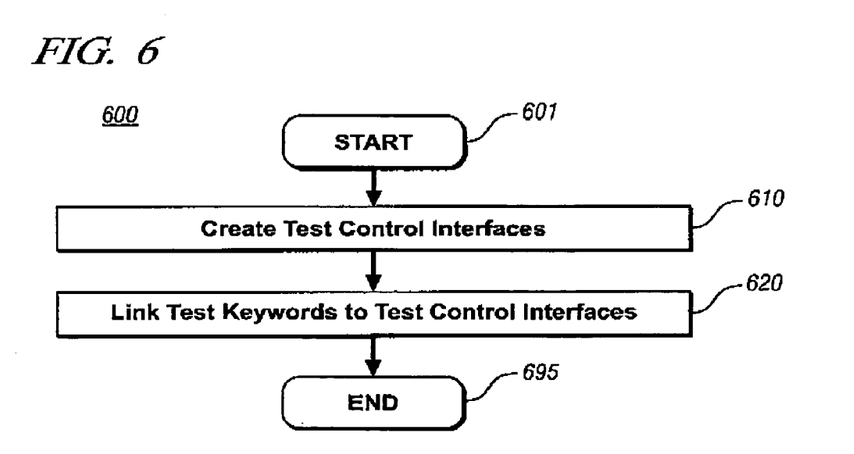
FIG. 6 illustrates a flowchart representative of one embodiment of a method for creating test control interfaces, in accordance with the present invention.

FIG. 6 illustrates a flowchart representative of one embodiment of a method 600 for creating test control interfaces, in accordance with the present invention. The method begins at 601.

During step 610, a plurality of test control interfaces 139 are created that correspond to the embedded module 139 under test. Examples of the interfaces created for a telematics unit include validation plan execution console, wireless interface, vehicle interface and speech recognition interface. The validation plan execution console is a graphical user interface component. Execution control and feedback for the testing of the selected requirements is available through this control panel. The wireless, vehicle and speech recognition interfaces are utilized to control and monitor the wireless, user, and mobile vehicle interfacing required for telematics unit validation. The test control interfaces allow the execution of the validation test plan to emulate direct user interaction with the embedded module. In one embodiment, test control interfaces tie into the input/output of the telematics unit allowing control and testing of subsystems such as GPS, voice, button interface and other human and electrical interfaces. In another embodiment, additional or different interfaces are created.

During step 620, the test keywords are linked to the test control interfaces. For example a test of the telematics unit power-on requirements uses a power-on keyword linked to the vehicle control interface of the telematics unit.

During step 695, method 600 is terminated.

Figure 7:
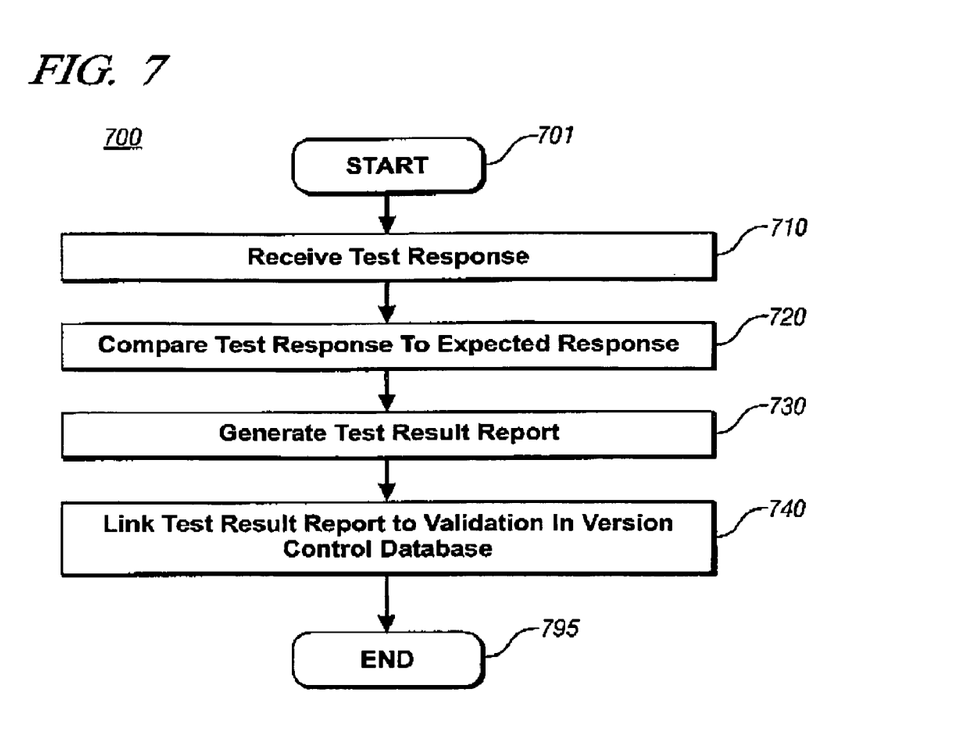
FIG. 7 illustrates a flowchart representative of one embodiment of managing test results, in accordance with the present invention.

FIG. 7 illustrates a flowchart representative of one embodiment of a method 700 for managing test results, in accordance with the present invention. The method begins at 701.

During step 710, a test response corresponding to the test keywords sent to the telematics unit is received at the call center. The test response is the output of the telematics unit in response to the test keywords input. For example, a test to check the current power status of the telematics unit returns the test response "sleep" corresponding to the action keyword check_power_mode and the response keyword power_mode.

During step 720, the test response is compared to an expected test response indexed to the test keywords. The expected test response is contained in the validation test plan in the column designated response parameters. A pass/fail flag is set based on the result of the comparison. The pass/fail flag indicates the success or failure of the test. A results database is used to store the test results and supporting data for archive and review.

During step 730, test result reports are generated from the results database based on the comparison of the actual test results to the expected test response. These test result reports can be formatted for various uses such as hardware troubleshooting, requirements review, and supplier reporting. Test result formats include executive summaries, sign-off reports, and test fail reports.

During step 730, the test results report is linked to the validation test plan in a version control database. The version control database ties the test results report to the associated version of the validation test plan and the version of the requirements from which the validation test plan was derived. Maintaining version control prevents loss of test results and incorrect linking of requirements and test results. Version control also allows recall of test results tied to specific requirements.

During step 795, method 700 is terminated.

Figure 8:
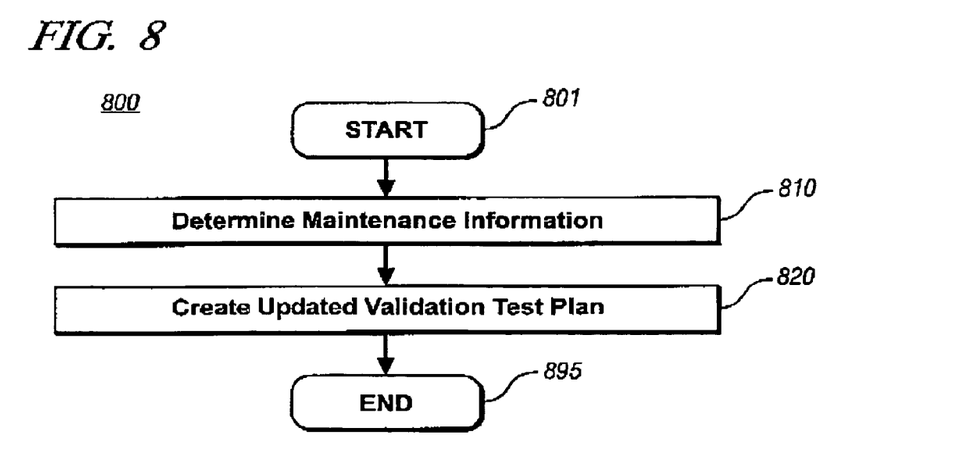
FIG. 8 illustrates a flowchart representative of one embodiment of a method for performing validation test plan maintenance, in accordance with the present invention.

FIG. 8 illustrates a flowchart representative of one embodiment of a method 800 for performing validation test plan maintenance, in accordance with the present invention. The method begins at 801.

During step 810, maintenance information corresponding to the test keywords sent to the telematics unit is determined. Maintenance information is feedback related to format and syntax checking of the validation test plan.

Maintenance information also includes information gleaned from execution of a validation test plan pertaining to timing values and parameter values that require modification.

During step 820, an updated validation test plan based on the determined maintenance information is created. The updated validation test plan is linked to the requirements and stored in the commonly formatted validation test plan database.

During step 895, method 800 is terminated.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for verifying an embedded module of a mobile vehicle, the method comprising:
   providing a validation test plan including a plurality of test keywords indexed to a requirement in a spread sheet format;
   receiving a validation test plan request including at least one requirement;
   determining the test keywords of the validation test plan based on the requirement according to a test keyword definition; and
   sending the test keywords from a call center to the embedded module and testing the embedded module using the test keywords.

2. The method of claim 1 wherein providing a validation test plan including a plurality of test keywords indexed to a requirement comprises;
   selecting the requirement from a requirements database;
   determining the test keywords required for testing against the requirement; and
   compiling the test keywords in a predefined validation test plan format.

3. The method of claim 1 further comprising:
   creating a plurality of test control interfaces corresponding to the telematics unit; and
   linking the test keywords to the test control interfaces.

4. The method of claim 1 further comprising:
   receiving a test response corresponding to the test keyword from the embedded module at the call center;
   comparing the test response to an expected response indexed to the requirement;
   creating a test results report based on the comparison; and
   linking the test results report to the validation test plan in a version control database.

5. The method of claim 1 further comprising:
   determining maintenance information corresponding to the test keywords sent to the embedded module; and
   creating an updated validation test plan based on the determined maintenance information.

6. The method of claim 1 wherein the test keyword definition is selected from the group consisting of action component, response component, timing control, action type, command type parameter, command type parameter value, requirement ID, and results.

7. A system for verifying an embedded module of a mobile vehicle, the system comprising:
   means for providing a validation test plan including a plurality of test keywords indexed to a requirement in a spread sheet format;
   means for receiving a validation test plan request including at least one requirement;
   means for determining the test keywords of the validation test plan based on the requirement; and
   means for sending the test keywords from a call center to the embedded module based on correspondence between the requirement and test keywords.

8. The system of claim 7 wherein means for providing a validation test plan including a plurality of test keywords indexed to a requirement comprises;
   means for selecting the requirement from a requirements database;
   means for determining the test keywords required for testing against the requirement; and
   means for compiling the test keywords in a predefined validation test plan format.

9. The system of claim 7 further comprising:
   means for creating a plurality of test control interfaces corresponding to the telematics unit; and
   means for linking the test keywords to the test control interfaces.

10. The system of claim 7 further comprising:
    means for receiving a test response corresponding to the test keyword from the embedded module at the call center;
    means for comparing the test response to an expected response indexed to the requirement;
    means for creating a test results report based on the comparison; and
    means for linking the test results report to the validation test plan in a version control database.

11. The system of claim 7 further comprising:
    means for determining maintenance information corresponding to the test keywords sent to the embedded module; and
    means for creating an updated validation test plan based on the determined maintenance information.

12. The system of claim 7 wherein the test keyword definition is selected from the group consisting of action component, response component, timing control, action type, command type parameter, command type parameter value, requirement ID, and results.

13. A computer readable medium storing a computer program including computer program code for verifying an embedded module of a mobile vehicle comprising:
    computer program code for providing a validation test plan including a plurality of test keywords indexed to a requirement in a spread sheet format;

computer program code for receiving a validation test plan request including at least one requirement;
computer program code for determining the test keywords of the validation test plan based on the requirement; and
computer program code for sending the test keywords from a call center to the embedded module; and
computer program code for testing the embedded module using the test keywords.

14. The computer readable medium of claim 13 wherein computer program code for providing a validation test plan including a plurality of test keywords indexed to a requirement comprises;
   computer program code for selecting the requirement from a requirements database;
   computer program code for determining the test keywords required for testing against the requirement; and
   computer program code for compiling the test keywords in a predefined validation test plan format.

15. The computer readable medium of claim 13 wherein the computer program code for testing the embedded module further comprises:
   computer program code for creating a plurality of test control interfaces corresponding to the telematics unit; and
   computer program code for linking the test keywords to the test control interfaces.

16. The computer readable medium of claim 13 further comprising:
   computer program code for receiving a test response corresponding to the test keyword from the embedded module at the call center;
   computer program code for comparing the test response to an expected response indexed to the requirement;
   computer program code for creating a test results report based on the comparison; and
   computer program code for linking the test results report to the validation test plan in a version control database.

17. The computer readable medium of claim 13 further comprising:
   computer program code for determining maintenance information corresponding to the test keywords sent to the embedded module; and
   computer program code for creating an updated validation test plan based on the determined maintenance information.

18. The computer readable medium of claim 13 wherein the test keyword definition is selected from the group consisting of action component, response component, timing control, action type, command type parameter, command type parameter value, requirement ID, and results.

* * * * *